United States Patent
Roemer et al.

(10) Patent No.: US 8,602,486 B2
(45) Date of Patent: Dec. 10, 2013

(54) ADJUSTING FIXTURE

(75) Inventors: Michael Roemer, Altdorf (DE); Johannes Preis, Bad Abbach/Lengfeld (DE); Dieter Jungert, Weissach (DE); Bernd Herrmann, Ehningen (DE); Joachim Paul, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/133,668

(22) PCT Filed: Dec. 8, 2009

(86) PCT No.: PCT/EP2009/008727
§ 371 (c)(1),
(2), (4) Date: Aug. 5, 2011

(87) PCT Pub. No.: WO2010/072322
PCT Pub. Date: Jul. 1, 2010

(65) Prior Publication Data
US 2011/0285168 A1 Nov. 24, 2011

(30) Foreign Application Priority Data

Dec. 16, 2008 (DE) .......... 10 2008 062 150

(51) Int. Cl.
*B62D 35/00* (2006.01)
(52) U.S. Cl.
USPC ..................................... 296/180.5
(58) Field of Classification Search
USPC ............... 296/180.1, 180.3, 180.5, 181.5
See application file for complete search history.

(56) References Cited

U.S. PATENT DOCUMENTS

| 6,170,904 | B1* | 1/2001 | Schaedlich et al. | 296/180.1 |
|---|---|---|---|---|
| 6,814,395 | B1* | 11/2004 | Lin | 296/180.1 |
| 7,201,432 | B2 | 4/2007 | Roth | |
| 7,287,798 | B2* | 10/2007 | King | 296/57.1 |
| 7,980,624 | B2* | 7/2011 | Hillen et al. | 296/180.5 |
| 2002/0021022 | A1* | 2/2002 | Erdelitsch et al. | 296/180.1 |
| 2005/0077753 | A1* | 4/2005 | Burg | 296/180.5 |
| 2005/0168013 | A1* | 8/2005 | Rinklin | 296/180.1 |
| 2006/0006694 | A1* | 1/2006 | Hillgaertner | 296/180.1 |
| 2011/0169298 | A1* | 7/2011 | Goenueldinc | 296/180.1 |
| 2012/0223545 | A1* | 9/2012 | Goenueldinc | 296/180.5 |

FOREIGN PATENT DOCUMENTS

| EP | 1 118 529 | 7/2001 |
|---|---|---|
| EP | 1 693 285 | 8/2006 |
| JP | 5-112265 | 5/1993 |
| JP | 2005-212719 | 8/2005 |
| WO | 2008/041757 | 4/2008 |

OTHER PUBLICATIONS

Chinese Office Action, Dec. 5, 2012.

* cited by examiner

*Primary Examiner* — Jason S Morrow
(74) *Attorney, Agent, or Firm* — Gerald E. Hespos; Michael J. Porco; Matthew T. Hespos

(57) ABSTRACT

A fixture (1) for adjusting an air guiding device (2) on a motor vehicle, comprising at least one linear adjustment device (3) for adjusting a linear deployment of the air guiding device (2), and at least one angle adjustment device (4) for adjusting an angle of attack of the air guiding device (2), wherein the adjustment devices (3, 4) are connected to the air guiding device (2) in a force-transmitting manner for adjustment of same.

14 Claims, 14 Drawing Sheets

ADJUSTING FIXTURE

BACKGROUND OF THE INVENTION

1. Field of the Invention

The invention relates to a fixture for adjusting an air guiding device on a motor vehicle. The invention also relates to an arrangement comprising an air guiding device and a fixture for adjustment of same. Finally, the application relates to a motor vehicle with an air guiding device adjustable in such a manner.

2. Description of the Related Art

Air guiding devices for motor vehicles serve to improve the road position and the aerodynamic properties of said motor vehicles, in particular at higher speeds. It is desirable in this connection to be able to adapt the position of the air guiding device to the particular requirements and circumstances.

The invention is therefore based on the object of providing a fixture for improved adjustability of an air guiding device.

The invention combines in an adjusting fixture, a linear adjustment device for adjusting the deployment of an air guiding device with an angle adjustment device for adjusting the angle of attack of the air guiding device.

SUMMARY OF THE INVENTION

The adjustment devices are preferably actuable independently of one another. By this means, the angle of attack of the air guiding device can be regulated independently of the deployment height of same.

Infinitely variable lockability in any intermediate position improves the flexibility of the adjusting fixture. By this means, the position of the air guiding device can be optimally adapted to the requirements and circumstances.

The formation of the adjustment devices with a spindle actuator is highly robust and furthermore permits precise and reliable adjustability of the air guiding device.

An integrated construction improves the aerodynamics and the optical appearance of the adjusting fixture.

A centrally arranged drive unit ensures synchronous adjustment of the laterally arranged linear adjustment devices.

A double mounting of the spindle of the adjustment devices improves the robustness and precision thereof.

A kinematic mechanism permits simple conversion of a linear movement into a tilting movement. In this connection, a multi-joint kinematic mechanism and/or an eccentric are/is particularly advantageous. Further advantages of the invention and features and details thereof emerge from the description of a number of exemplary embodiments with reference to the drawings.

DETAILED DESCRIPTION OF THE PREFERRED EMBODIMENTS

Figure 1:
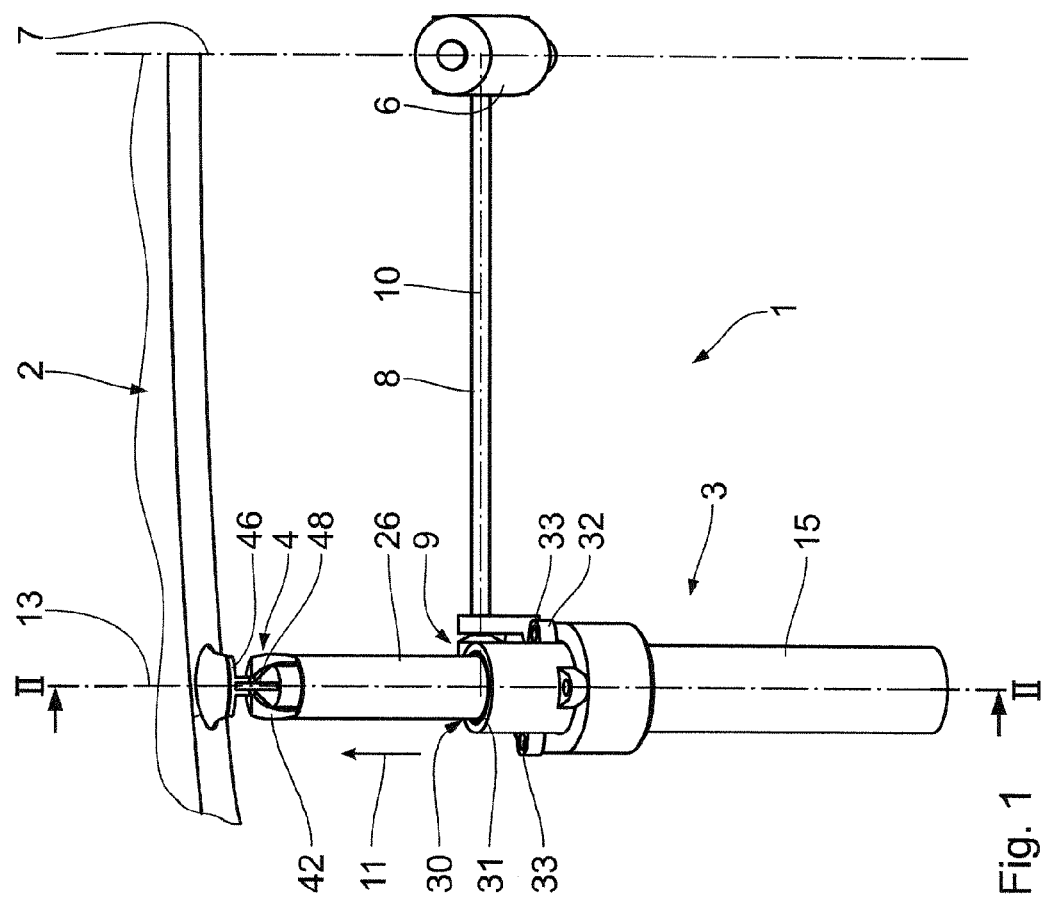
FIG. 1 shows a schematic partial view of an air guiding device with an adjusting fixture according to a first exemplary embodiment.
Figure 2:
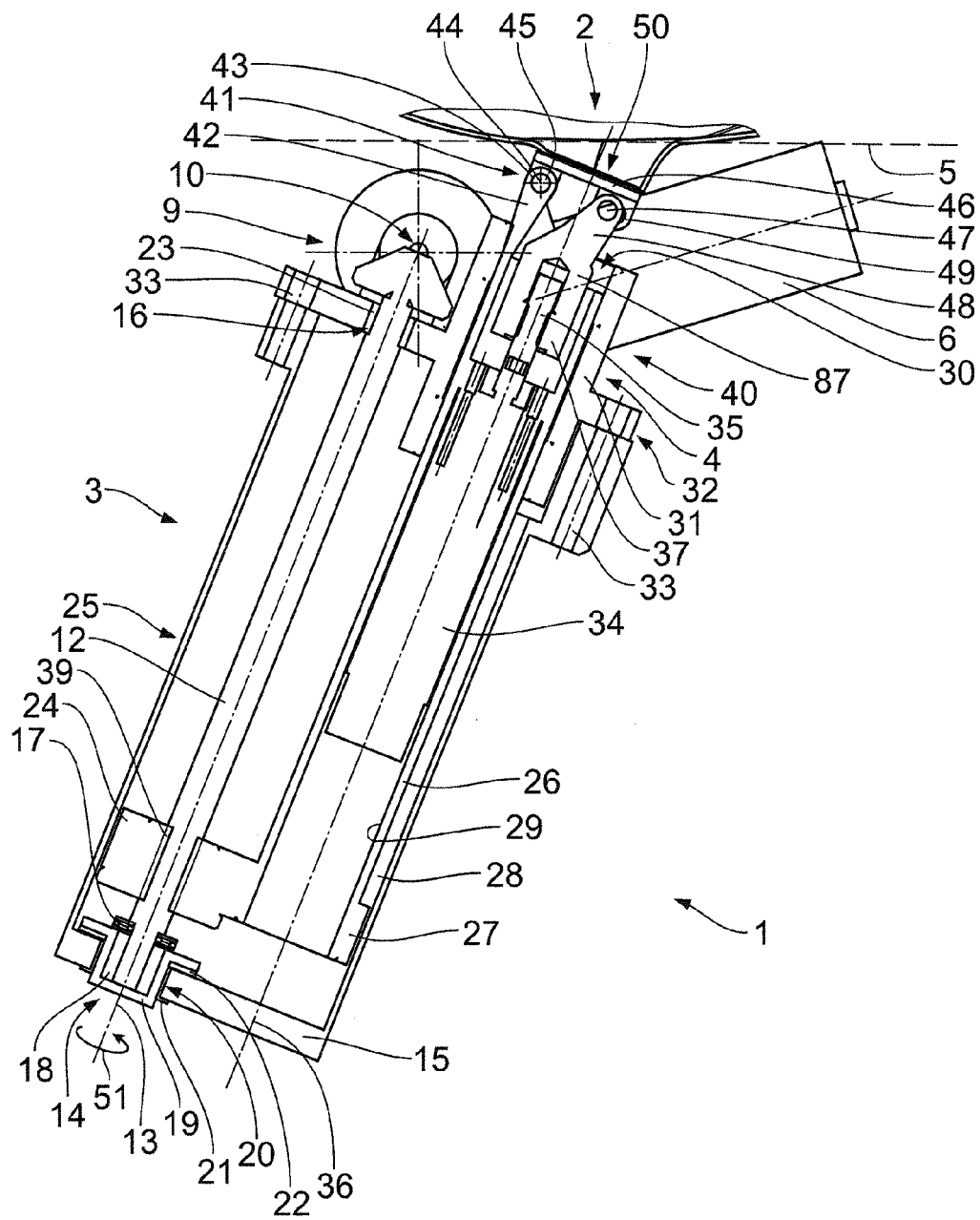
FIG. 2 shows a sectional illustration along the line II-II of the exemplary embodiment according to FIG. 1.
Figure 3:
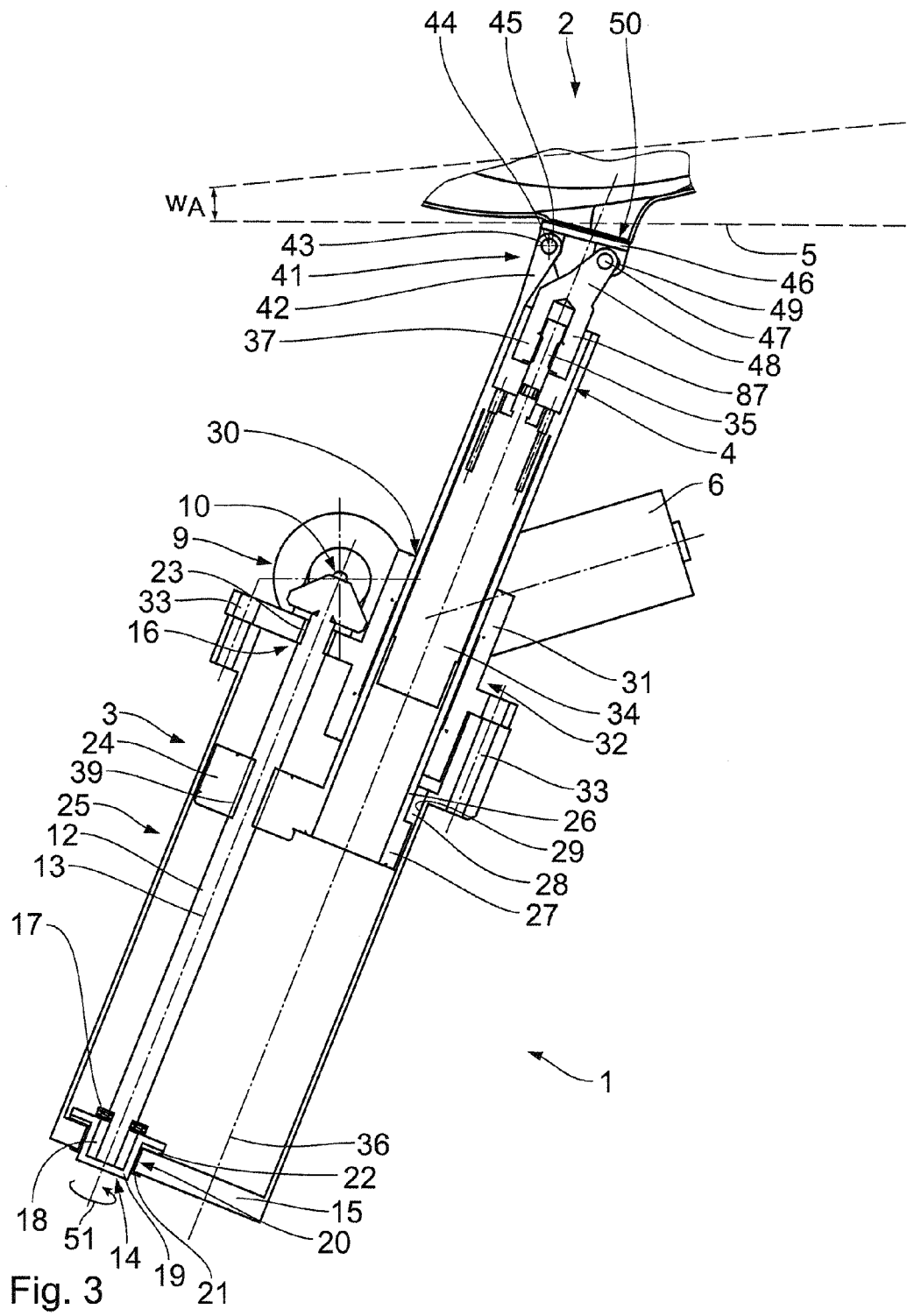
FIG. 3 shows an illustration according to FIG. 2 with the air guiding device deployed.
Figure 4:
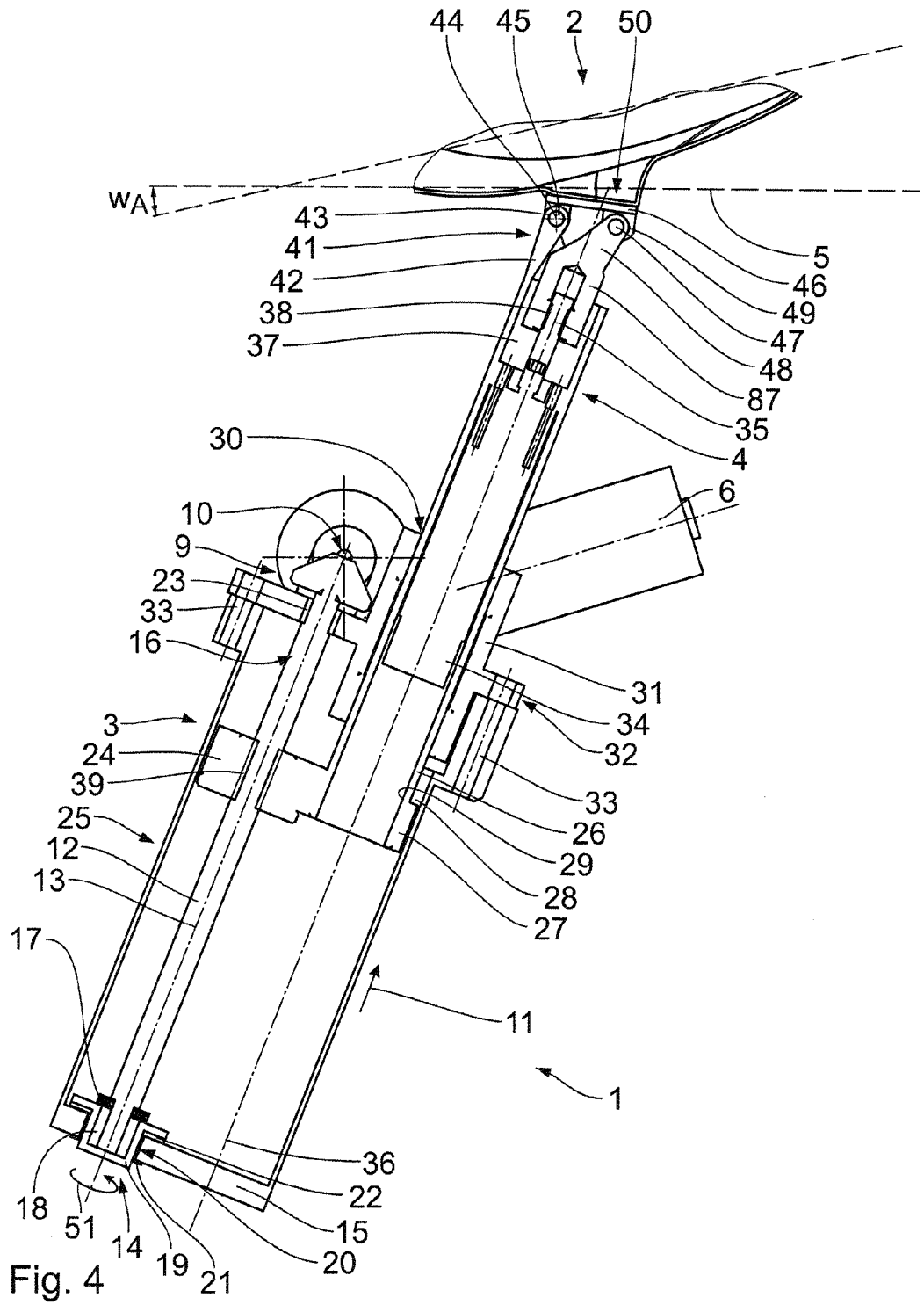
FIG. 4 shows an illustration according to FIG. 3 with the air guiding device pivoted.
Figure 5:
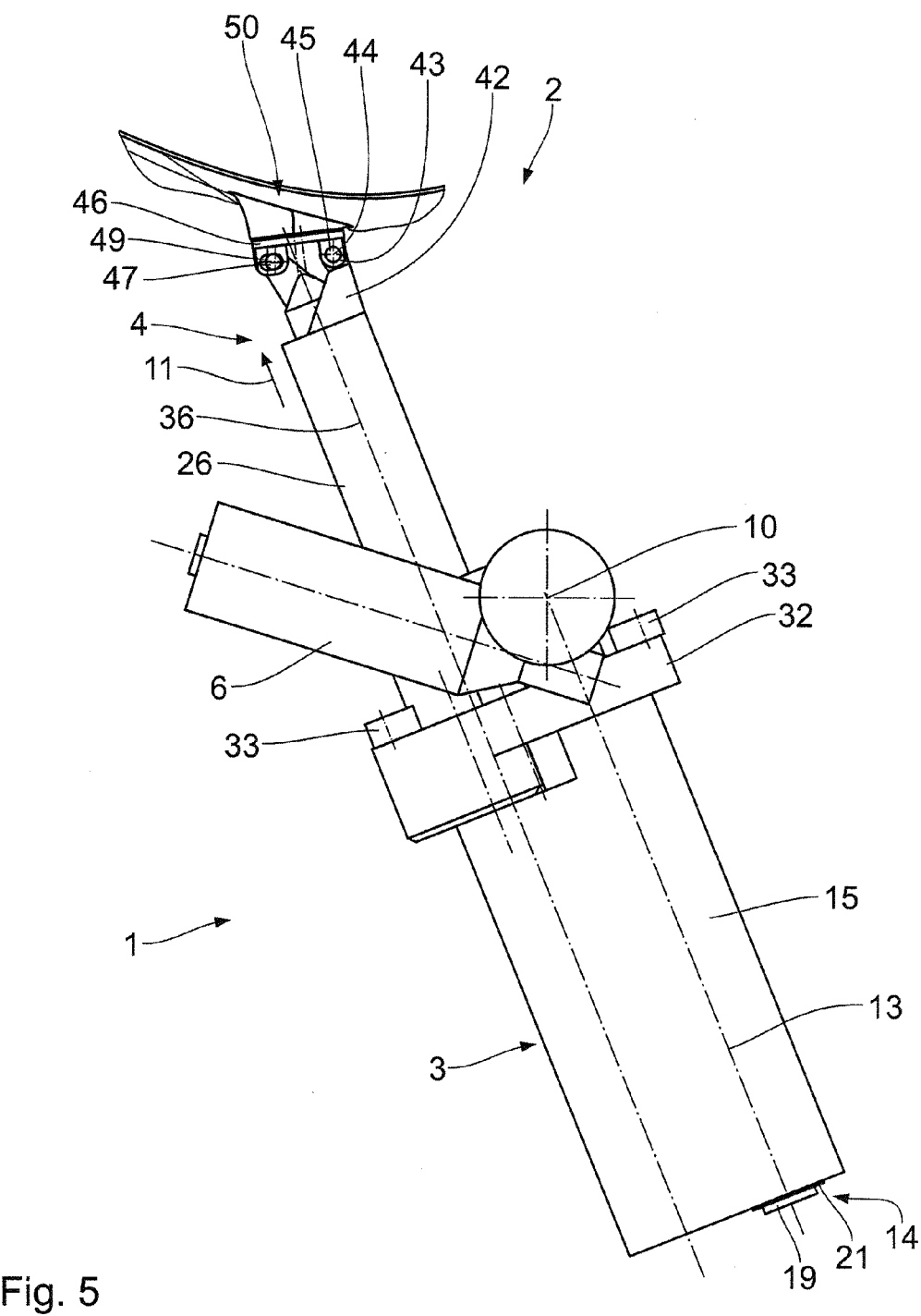
FIG. 5 shows a side view of the exemplary embodiment according to FIG. 1.

A first exemplary embodiment of the invention is described below with reference to FIGS. 1 to 5. A fixture 1 for adjusting an air guiding device 2 on a motor vehicle comprises two deployment devices 3 and positioning devices 4 arranged symmetrically with respect to a central longitudinal plane 7 of the motor vehicle. The deployment devices 3 form a linear adjustment device and serve to adjust the linear deployment of the air guiding device 2 along a deployment direction 11. The positioning devices 4 form an angle adjustment device and serve to adjust an angle of attack $w_A$ of the air guiding device 2. The angle of attack $w_A$ refers to the angle of the air guiding device 2 with respect to a horizontal plane 5. The precise numerical value of the angle of attack $w_A$ is unimportant below. It therefore does not matter where or how said value is measured in the air guiding device 2 according to the invention.

The fixture 1 comprises a drive unit which is arranged centrally between the deployment devices 3 forming the linear adjustment device and is designed as an electric motor 6. The electric motor 6 is coupled to the deployment devices 3 via a drive shaft 8. The drive shaft 8 is mounted rotatably about a drive shaft axis 10 which is arranged perpendicularly to the central longitudinal plane 7. The drive shaft 8 is preferably designed to be rigid. By this means, the transmission of force from the electric motor 6 to the deployment devices 3 is improved. In order to save weight, the drive shaft 8 can be designed as a hollow shaft. However, a solid design is also possible. The drive shaft 8 is coupled to the deployment device 3 via a gearing 9. The gearing 9 is preferably designed as a worm gearing or bevel gearing.

The deployment devices 3 are arranged in such a manner that the air guiding device 2 is adjustable with the aid thereof along a deployment direction 11. The deployment direction 11 is perpendicular to the drive shaft axis 10.

A torque generated by the electric motor 6 can be transmitted via the drive shaft 8 to a spindle 12 of the deployment device 3 by means of the gearing 9. The spindle 12 is aligned along a spindle axis 13 parallel to the deployment direction 11.

The gearing 9 is preferably of self-locking design. It is designed in particular as a reduction gearing with a reduction ratio in the range of 1 to 10 to 1 to 200, preferably in the range of 1 to 50 to 1 to 100.

The spindle 12 is mounted at the end thereof opposite the gearing 9 in a housing 15 of the deployment device 3 by means of a first mounting 14. The spindle 12 is also mounted in the region of the end thereof opposite the first mounting 14 in the housing 15 by means of a second mounting 16. The spindle 12 is arranged in a particularly stable manner in the housing 15 by this double mounting.

The first mounting 14 comprises an axial bearing 17, a freewheel 18, a driver 19 which is arranged in a bearing bushing 20 with a collar 21, and a brake disk 22.

The second mounting 16 comprises in particular a radial bearing.

A spindle nut 24 is arranged on the spindle 12. The spindle nut 24 has an internal thread 39 matched to the spindle 12. The spindle nut is mounted in the housing 15 for conjoint rotation. The spindle nut 24 is therefore mounted so as to be displaceable in the housing 15 by rotation of the spindle 12 in the direction of the spindle axis 13. The spindle 12 and the spindle nut 24 form a first spindle drive, the deployment spindle drive 25.

The deployment spindle drive 25 is lockable in infinitely variable intermediate positions. Locking of the deployment spindle drive 25 can be assisted by the brake disk 22 in the first mounting 14 of the spindle 12. The deployment device 3 is therefore reliably secured against an unintentional adjustment. It can be set in an infinitely variable manner, i.e. permits infinitely variable setting of the deployment height of the air guiding device 2.

The spindle nut 24 is connected fixedly to a dip tube 26. The dip tube 26 is, for example, adhesively bonded or welded to the spindle nut 24. The dip tube 26 may also be formed integrally with the spindle nut 24. The dip tube 26 is mounted in the housing 15 in a manner secured against rotation. For this purpose, said dip tube has radially protruding extensions 27 which engage in guide grooves 28, which extend in a direction parallel to the spindle axis 13, in an inner wall 29 of the housing 15. However, the dip tube 26 may also be mounted rotatably in the housing 15. This is advantageous in particular when the air guiding device 2 is mounted on the adjusting fixture 1. The dip tube 26 is dimensionally stable. It is preferably made of metal.

By displacement of the spindle nut 24 along the spindle axis 13, the dip tube 26 is displaceable together with said spindle nut parallel to the deployment direction 11. It can be guided out of the housing 15. For this purpose, the housing 15 has a delivery opening 30. In the region of the delivery opening 30, the dip tube 26 is mounted in the housing 15 by means of a dip tube mounting 31.

The dip tube mounting 31, like the second mounting 16 of the spindle 12, is preferably arranged in a cover 32 of the housing 15, which cover is removable from said housing. The cover 32 is part of the housing 15. It is connected fixedly thereto, in particular is screwed thereto by means of cover screws 33. By this means, the cover 32 is removable from the housing 15. This permits simple assembly and particularly simple inspection and maintenance of the adjusting fixture 1.

The positioning devices 4 are described in more detail below. The positioning devices 4 each comprise a positioning motor 34 which forms a drive device for the positioning device 4. An electric motor is preferably provided as the positioning motor 34. The positioning motor 34 is arranged non-rotatably in the dip tube 26 of the deployment device 3. In addition, the positioning motor 34 is connected fixedly to the dip tube 26 in a direction parallel to the spindle axis 13. The positioning motor 34 is therefore integrated in the deployment device 3.

The positioning motor 34 is connected via a spiral cable 82 to a control device 83 (only illustrated schematically) with an energy supply unit. For this purpose, the spiral cable 82 is guided through a cable lead-through opening 84 in the base 85 of the housing 15. In principle, the control device 83 and/or the energy supply unit may also be arranged in the housing 15. The spiral cable 82 also serves for the data- and/or energy-transmitting connection of an encoder for controlling the positioning motor 34 to the control device 83. The encoder is designed as a rotary or linear encoder. It preferably comprises a Hall sensor.

Furthermore, the positioning device 4 comprises a positioning spindle 35. The positioning spindle 35 is mounted rotatably, in particular in a rotationally drivable manner, about a positioning spindle axis 36. For this purpose, said positioning spindle is coupled to the positioning motor 34 in a torque-transmitting manner. The positioning spindle axis 36 runs parallel to the spindle axis 13.

A positioning spindle nut 37 is arranged on the positioning spindle 35. The positioning spindle nut 37 has an internal thread 38 matched to the positioning spindle 35. The positioning spindle nut 37 is therefore displaceable by rotation of the positioning spindle 35 in a direction parallel to the positioning spindle axis 36.

The positioning spindle nut 37 is connected fixedly to a binding element 87. It may also be formed integrally with the binding element 87. The positioning spindle nut 37 and the binding element 87 are referred to together below as the positioning spindle nut 37.

The positioning spindle 35, together with the positioning spindle nut 37, forms a second spindle drive, the positioning spindle drive 40. The positioning spindle drive 40 is displaceable together with the dip tube 26 by the deployment spindle drive 25 in a direction parallel to the positioning spindle axis 36, i.e. parallel to the deployment direction 11. The positioning spindle drive 40 is lockable in infinitely variable intermediate positions. The angle of attack $w_A$ of the air guiding device 2 is therefore settable in an infinitely variable manner.

The positioning device 4 and the deployment device 3 are actuable independently of one another.

A first fastening element 41 is provided on the dip tube 26 to bind the air guiding device 2 to the adjusting fixture 1. The first fastening element 41 is designed as an elongation 42 of the dip tube 26. A bore 43 which is aligned perpendicularly to the positioning spindle axis 36 is provided in the elongation 42. The bore 43 defines a positioning pivot axis 44 about which the air guiding device 2 can be pivoted by means of the positioning device 4. For this purpose, a pivoting pin 45 is mounted pivotably about the positioning pivot axis 44 in the bore 43. The positioning pivot axis 44 forms a fixed bearing. The pivoting pin 45 is connected fixedly to a fastening element 46 of the air guiding device 2. Said pivoting pin can preferably be formed integrally with the fastening element 46. The fastening element 46, for its part, is connected fixedly, in particular screwed or welded, to the air guiding device 2. It may also be formed integrally with the air guiding device 2.

Of course, it is equally possible to arrange the pivoting pin 45 fixedly on the elongation 42 of the dip tube 26 and to provide the fastening element 46 with the bore 43 for receiving the pivoting pin 45. A corresponding connection is preferably provided for the second binding of the air guiding device 2 to the positioning device 4. For this purpose, a positioning pin 47 is connected fixedly to an elongation 48 of the positioning spindle nut 37. The positioning pin 47 is guided through in a binding opening, which is designed as an elongated hole 49, in the fastening element 46. The elongated hole 49 is dimensioned precisely such that the positioning pin 47 is guided displaceably in the elongated hole 49 perpendicularly to the longitudinal alignment without any play. This avoids undesirable rattling noises due to vibrations of the air guiding device 2. The elongated hole 49 forms a movable bearing.

The positioning spindle drive 40 is preferably of self-locking design. For particularly precise cooperation of the positioning device 4 and the fastening element 46, the positioning spindle nut 37 with the elongation 48 and the positioning pin 47 and/or the fastening element 46 with the elongated hole 49 may be designed as CNC milled components.

By means of the elongated hole 49, a change in the distance between the positioning pivot axis 44 and the positioning pin 47 can be compensated for by means of the positioning spindle 35 upon displacement of the positioning spindle nut 37 in the direction of the positioning spindle axis 36. Said elongated hole therefore forms a compensating device.

The binding of the air guiding device 2 to the positioning device 4 by means of the pivot pin 45 mounted in the bore 43 and the positioning pin 47 mounted in the elongated hole 49 forms a positioning kinematic mechanism 50, by means of which a linear movement, which is brought about by the positioning spindle drive 40, of the positioning spindle nut 37 in a direction parallel to the positioning spindle axis 36 can be converted into a pivoting movement of the air guiding device 2 about the positioning pivot axis 44.

The setting of the angle of attack $w_A$ and/or of the deployment height of the air guiding device 2 is controllable by means of the control device 83. The latter can determine the optimum setting of the air guiding device 2 preferably from inputs, for example by means of sensors, regarding the environmental conditions and in particular regarding the speed of the motor vehicle and said setting can be set by activating the motors 6, 34. Of course, individual adaptations by the user may be permitted here.

The functioning of the adjusting fixture 1 is described below. In order to adjust the deployment height, the spindle 12 of the deployment spindle drive 25 is actuated, i.e. is rotated about the spindle axis 13 thereof, by means of the electric motor 6 via the drive shaft 8 and the gearing 9. In this case, the rotational speed of the drive shaft 8 is reduced by the gearing 9. The resulting rotational speed of the spindle 12 is preferably lower than 1000/min. This permits particularly precise and quiet adjustment of the deployment height of the air guiding device 2. A self-locking design of the gearing 9 facilitates the infinitely variable adjustability of the deployment height of the air guiding device 2 by means of the deployment device 3. By rotation of the spindle 12, the spindle nut 24 is displaced on the spindle 12 in a direction parallel to the spindle axis 13. Whereas rotation of the spindle in a first direction of rotation 51 leads to displacement of the spindle nut 24 in the deployment direction 11, rotation of the spindle 12 in the opposite direction causes displacement of the spindle nut 24 counter to the deployment direction 11. The air guiding device 2 can therefore be both deployed and retracted by means of the deployment devices 3.

By means of the displacement of the spindle nut 24, the dip tube 26 which is connected thereto and therefore the air guiding device 2, which is bound to said dip tube by means of the fastening element 46, are also displaced in a direction parallel to the deployment direction 11. Such an adjustment of the air guiding device 2 parallel to the deployment direction 11 by means of the deployment device 3 is independent of an adjustment of the angle of attack $w_A$ by means of the positioning device 4.

In order to adjust the angle of attack $w_A$ of the air guiding device 2, the positioning motor 34 for driving the positioning spindle drive 40 is actuated. By this means, the positioning spindle 35 is rotated about the positioning spindle axis 36, this leading to a displacement of the positioning spindle nut 37 in a direction parallel to the positioning spindle axis 36. Displacement of the positioning spindle nut 37 in a direction parallel to the positioning spindle axis 36 leads to the air guiding device 2 pivoting about the positioning pivot axis 44 which is fixed in position with respect to the dip tube 26 and therefore with respect to the positioning spindle 35, which is arranged in the dip tube 26, of the positioning device 4. Depending on the direction of rotation of the positioning spindle 35, the angle of attack $w_A$ is thereby increased or reduced.

Upon adjustment of the angle of attack $w_A$ of the air guiding device 2 by means of the positioning device 4 by the positioning spindle nut 37 being displaced on the positioning spindle 35, a resultant change in the distance between the positioning pin 47, which is connected fixedly to the positioning spindle nut 37, and the positioning pivot axis 44 is compensated for by movement of the positioning pin 47 in the elongated hole 49 in the fastening element 46.

Figure 6:
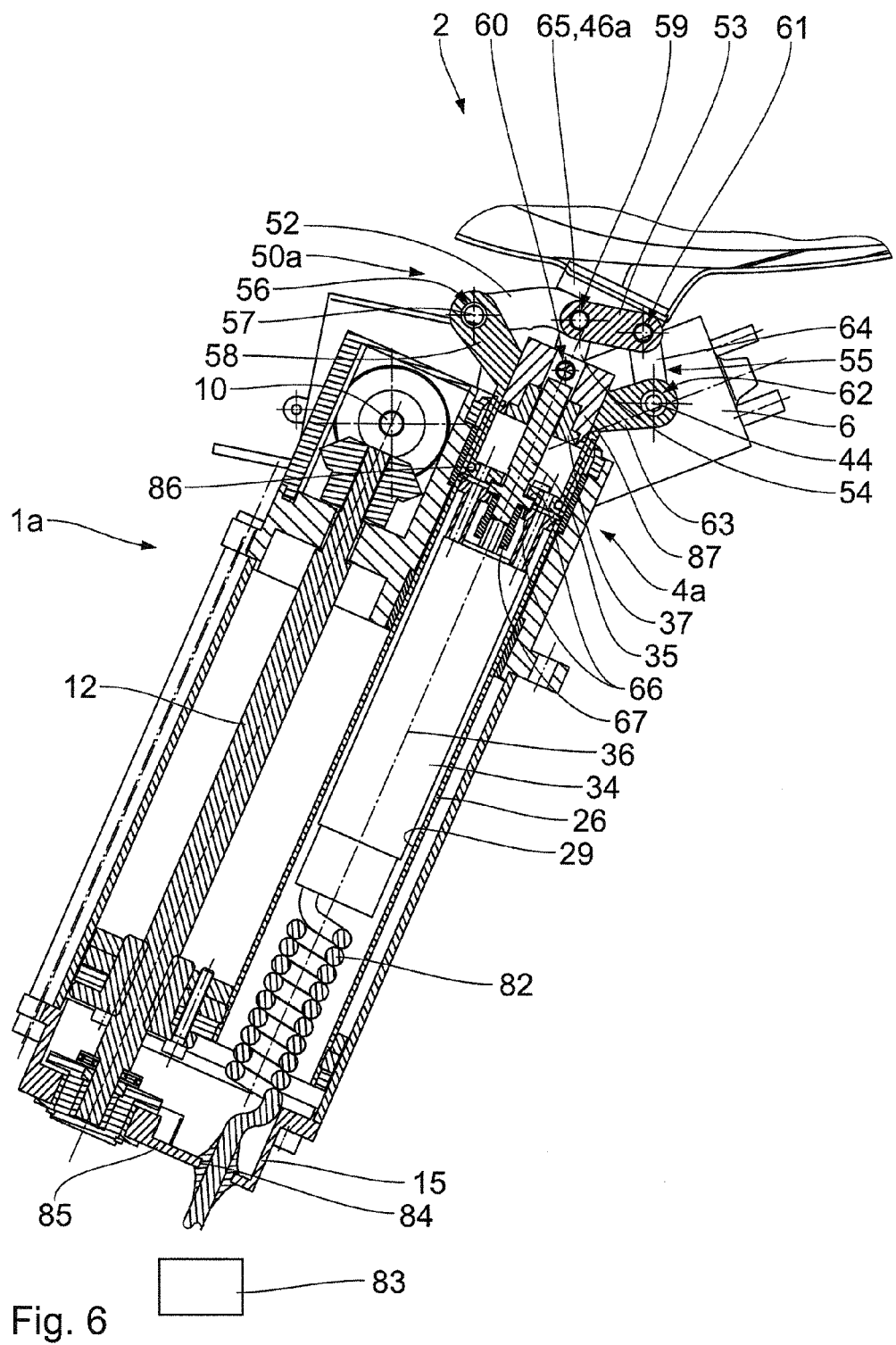
FIG. 6 shows an illustration according to FIG. 2 of a second exemplary embodiment of the invention.
Figure 7:
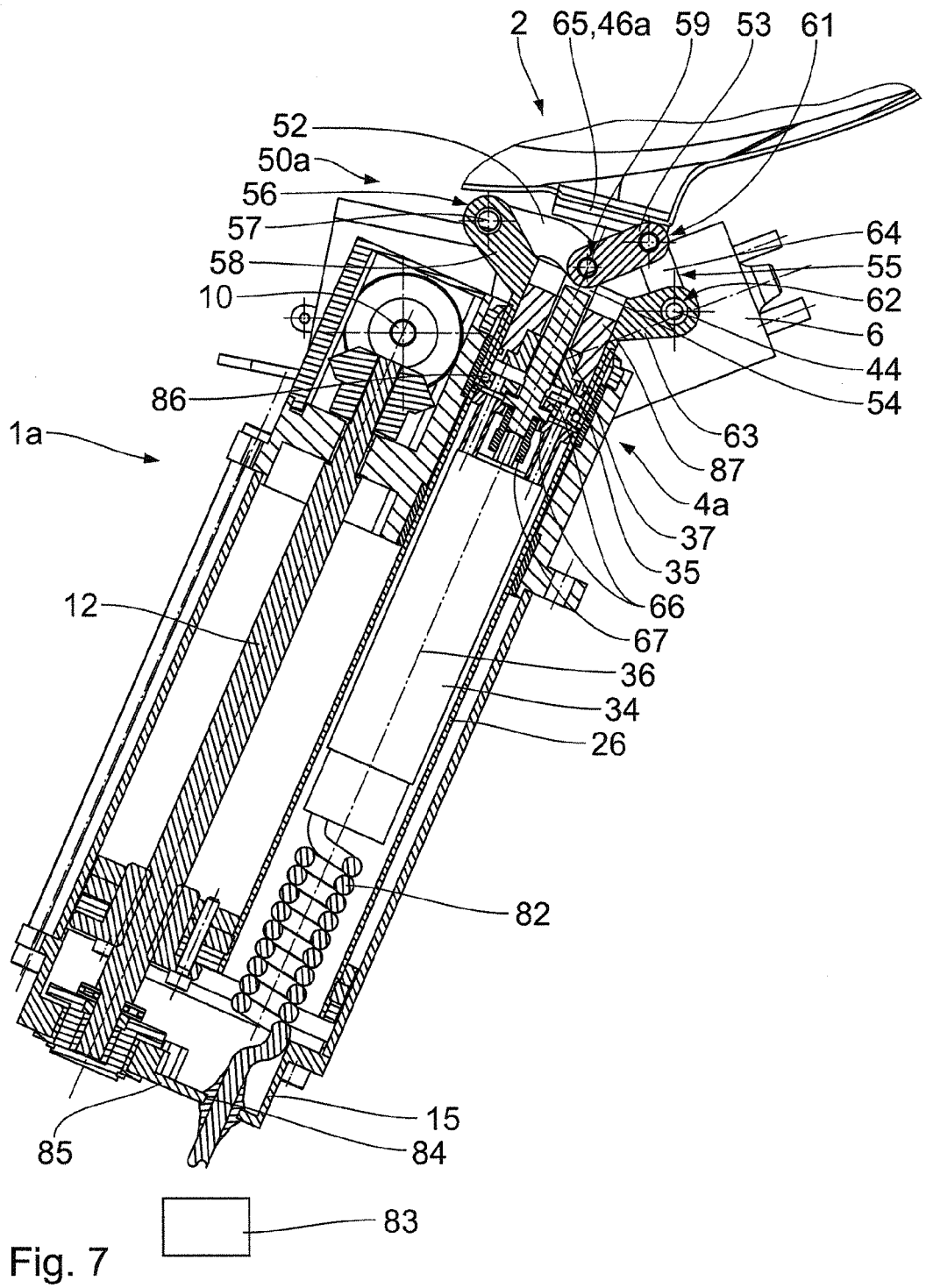
FIG. 7 shows an illustration of the exemplary embodiment according to FIG. 6 with the air guiding device positioned.
Figure 8:
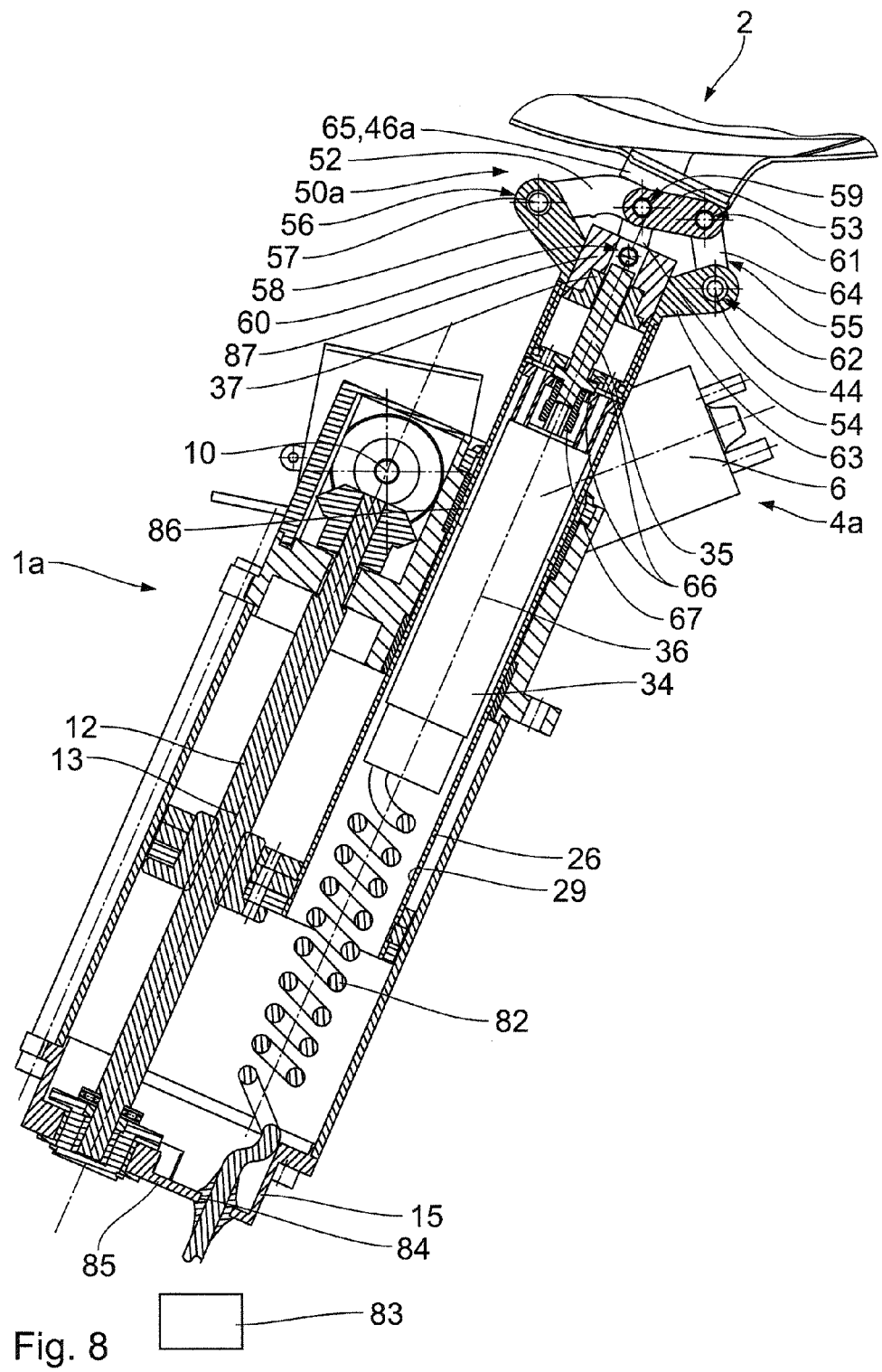
FIG. 8 shows an illustration of the exemplary embodiment according to FIG. 6 with the air guiding device deployed.

A second exemplary embodiment of the invention is described below with reference to FIGS. 6 to 8. Identical parts receive the same reference numbers as in the first exemplary embodiment, to the description of which reference is hereby made. Functionally identical, but structurally different parts receive the same reference numbers followed by an a. The difference over the first exemplary embodiment resides in the design of the positioning kinematic mechanism 50a, by means of which the air guiding device 2 is bound to the positioning devices 4a. The positioning kinematic mechanism 50a is designed as a multi-lever kinematic mechanism, in particular as a four lever kinematic mechanism. The design of the positioning kinematic mechanism 50a is also referred to as a multi-joint kinematic mechanism, in particular as a five joint kinematic mechanism.

The positioning kinematic mechanism 50a comprises a first and a second kinematic lever 52, 53, a drive lever 54 and a binding lever 55. The first kinematic lever 52 is connected by means of a first mounting 56 to an extension 58 in a manner that it can pivot about a first pivot axis 57 running perpendicularly to the positioning spindle axis 36. The extension 58 is connected fixedly to the dip tube 26. It is preferably formed integrally with the dip tube 26. However, it may also be screwed, adhesively bonded or welded to the dip tube 26. The first kinematic lever 52 is designed to be angled or bent. At the end thereof opposite the first mounting 56, the first kinematic lever 52 is connected by means of a second mounting 59 to the second kinematic lever 53 and the drive lever 54. In addition, the drive lever 54 is coupled by means of a third mounting 60 to the positioning spindle nut 37. At the end thereof opposite the second mounting 59, the second kinematic lever 53 is connected to the binding lever 55 by means of a fourth mounting 61. Said binding lever is finally connected to a further extension 63 by means of a fifth mounting 62. The extension 63 is preferably formed integrally with the extension 58. The mountings 56, 59, 60, 61 and 62 each define pivot bearings which permit the respective levers to be pivotable about axes parallel to the first pivot axis 57. The four levers 52, 53, 54 and 55 are connected to one another pivotably about pivot axes running parallel to one another in particular by means of the five mounting 56, 59, 60, 61, 62. In this case, the first and the fifth mounting 56, 62 each form a fixed bearing which is connected fixedly to the dip tube 26.

The second, third and fourth mountings 59, 60 and 61 each form a movable bearing.

By means of the multi-lever connections between the positioning spindle nut 37 and the two fixed bearings 56, 62, the positioning kinematic mechanism 50*a* forms a compensating device for compensating for a change in distance between the positioning spindle nut 37 and the two fixed bearings 56, 62, said change in distance necessarily occurring upon displacement of the positioning spindle nut 37 on the positioning spindle 35.

The binding lever 55 is of angled design. It may also be of bent design. It is pivotable about the fifth mounting 62 which forms the positioning pivot axis 44. The binding lever 55 comprises a first partial limb 64 and a second partial limb 65. The partial limbs 64, 65 are formed integrally with each other. The first partial limb 64 connects the fifth mounting 62 and the fourth mounting 61. The second partial limb 65 forms the fastening element 46*a* and serves for the binding to the air guiding device 2. It is connected fixedly, preferably screwed, to the air guiding device 2.

In a particularly advantageous embodiment, the positioning kinematic mechanism 50*a* is designed as an interchangeable module. It is connectable in a simple manner to the dip tube 26 for installation. For this purpose, it is inserted into that end of the dip tube 26 which faces the air guiding device 2 and is connected, for example adhesively bonded or welded, preferably screwed, to said dip tube. It is sealed off here from the inner wall 29 of the dip tube 26 by an O ring 86.

The positioning spindle 35 is mounted in a positioning spindle bearing 66. The positioning spindle bearing 66 is designed in particular as an axial bearing. However, a radial bearing is also possible. A coupling 67 is provided to bind the positioning spindle 35 to the positioning motor 34. The coupling 67 is of sleeve-shaped design. It is preferably blockable and therefore permits infinitely variable locking of the positioning device 4*a*.

In order to adjust the angle of attack $w_A$, the drive lever 54 is provided. The drive lever 54 is connected at one end via the second mounting 59 to the kinematic levers 52 and 53 and at the other end via the third mounting 60 to the positioning spindle nut 37. In this exemplary embodiment too, the angle of attack $w_A$ of the air guiding device 2 is adjusted by rotation of the positioning spindle 35 about the positioning spindle axis 36, as a result of which the positioning spindle nut 37, which is connected to the drive lever 54, is displaced on the positioning spindle 35. The drive lever 54 is therefore displaceable by actuation of the positioning motor 34 of the positioning device 4*a*. In this case, the second mounting 59 can be guided through a dead center position on the connecting line between the first mounting 56 and the fourth mounting 61. The air guiding device 2 is therefore located in dynamically stable positions in the two mutually opposite end positions of the positioning spindle nut 37 on the positioning spindle 35 of the positioning device 4*a*. This means in particular that the force exerted by the air guiding device 2 on the kinematic mechanism 50*a* during normal operation precisely counteracts a deflection of the air guiding device 2 out of the end position. An unintentional and undesirable adjustment of the air guiding device 2 from said end positions is therefore automatically and reliably avoided.

The dead center position of the second mounting 59 is located in the vicinity of the position which corresponds to a maximally extended position of the positioning spindle nut 37. It can be reached in particular by less than two revolutions of the positioning spindle 35 starting from the extended end position of the positioning spindle nut 37.

The binding of the air guiding device 2 to the positioning device 4*a* via the three spaced apart mountings 56, 60, 62 is particularly stable and leads to a secure fastening of the air guiding device 2 to the motor vehicle. The stability of the fixture 1*a* is further improved by the design of the positioning kinematic mechanism 50*a* as a multi-joint kinematic mechanism with dead center positions.

Figure 9:
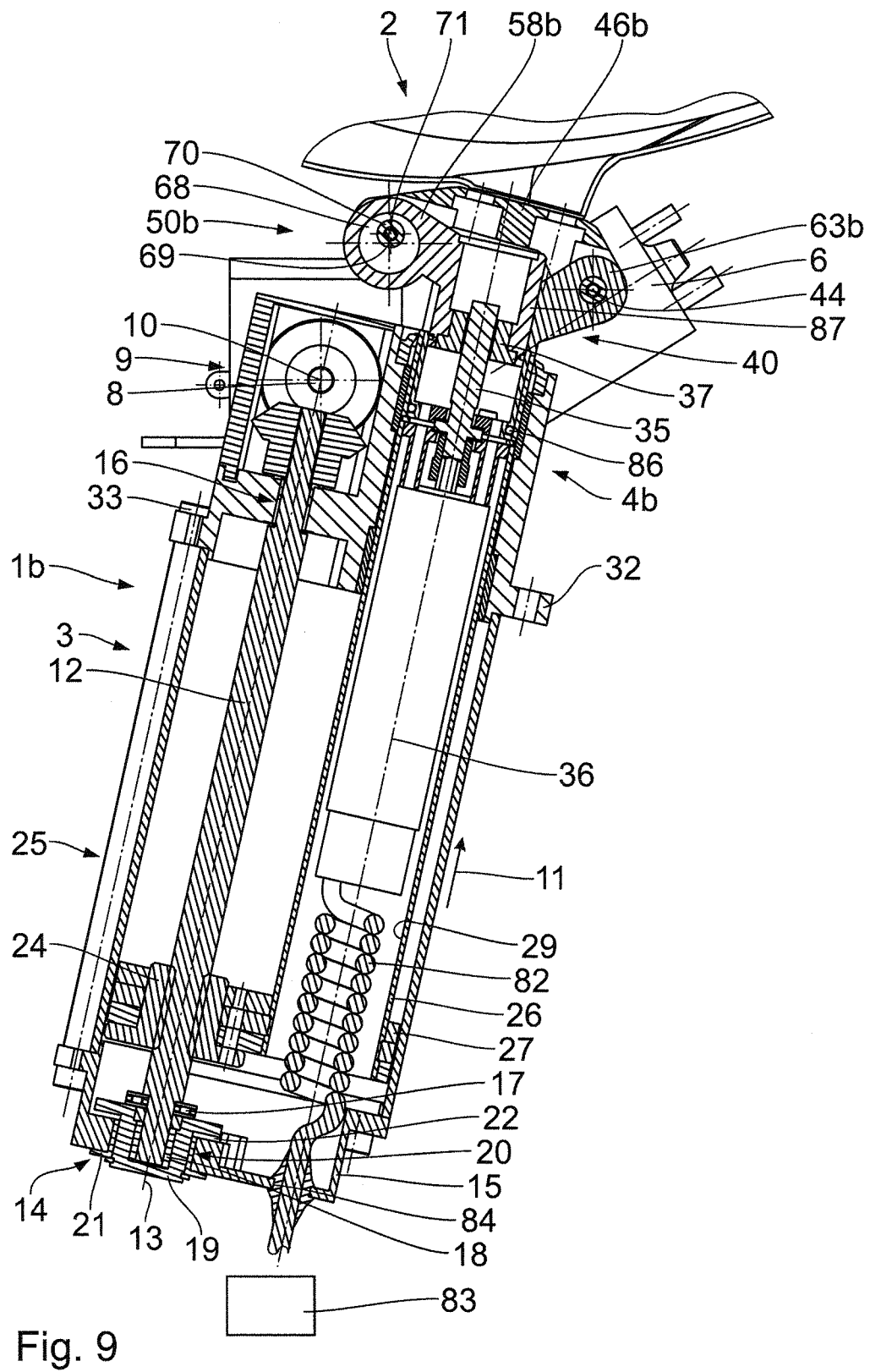
FIG. 9 shows an illustration according to FIG. 2 of a third exemplary embodiment of the invention.
Figure 10:
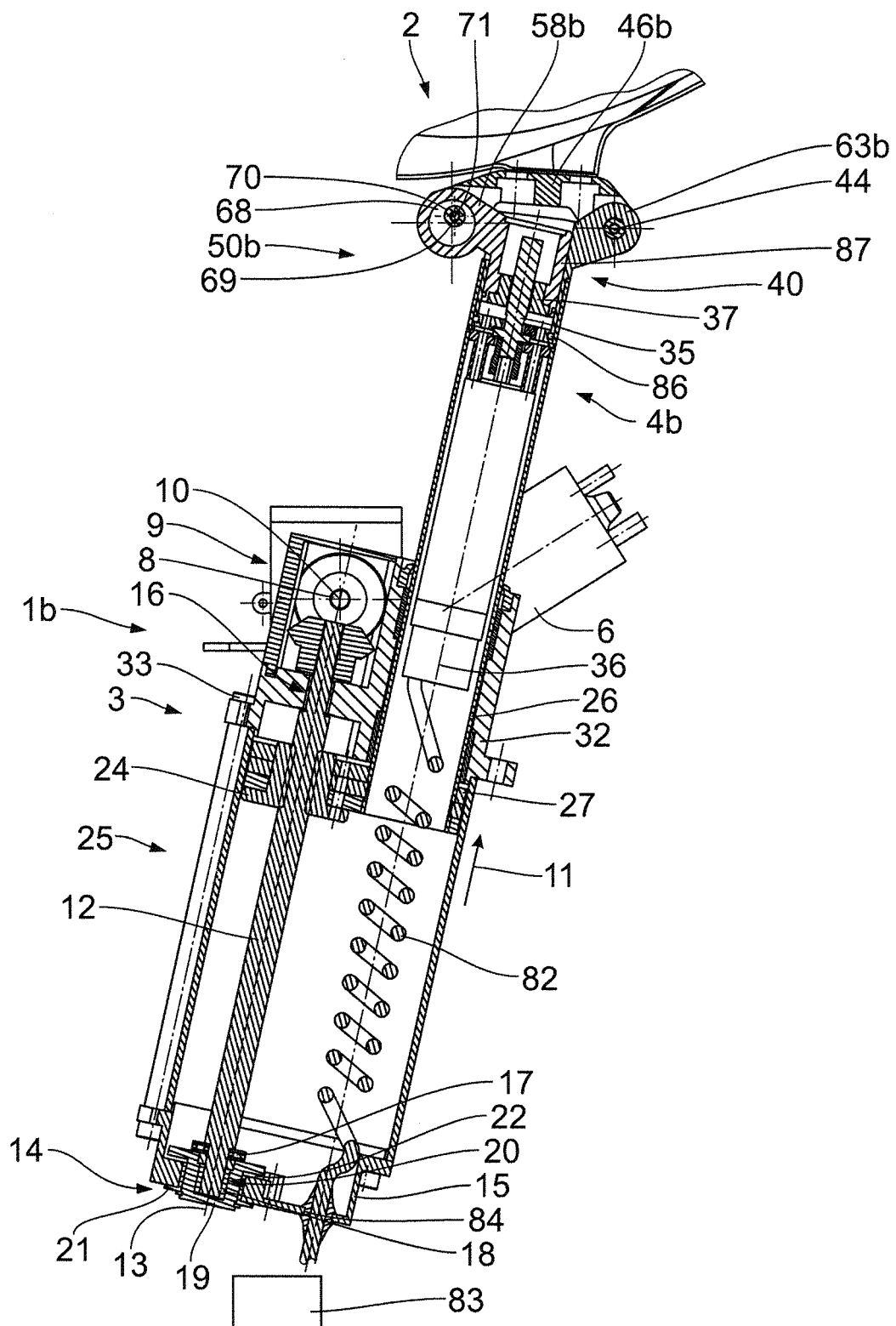
FIG. 10 shows an illustration of the exemplary embodiment according to FIG. 9 with the air guiding device deployed and positioned.
Figure 11:
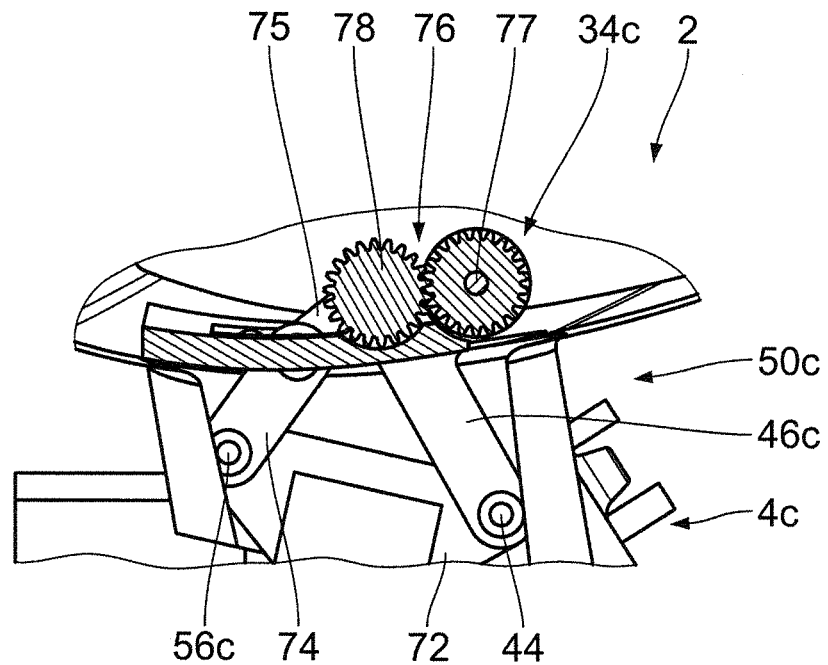
FIG. 11 shows a sectional illustration of a fourth exemplary embodiment of the invention.
Figure 12:
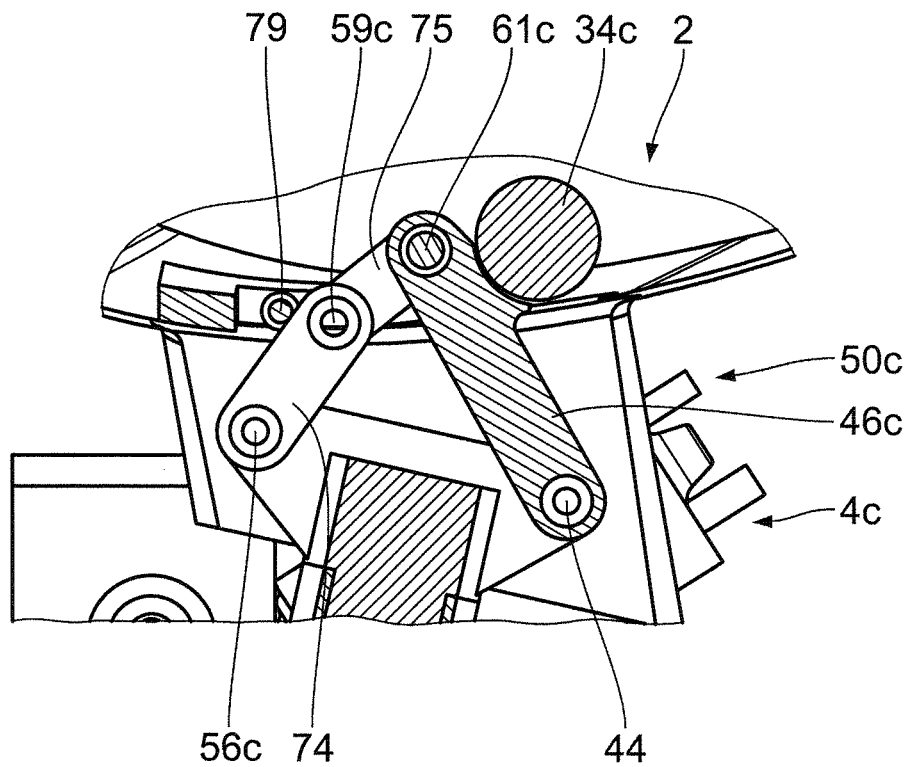
FIG. 12 shows a further sectional illustration of the fourth exemplary embodiment of the invention.
Figure 13:
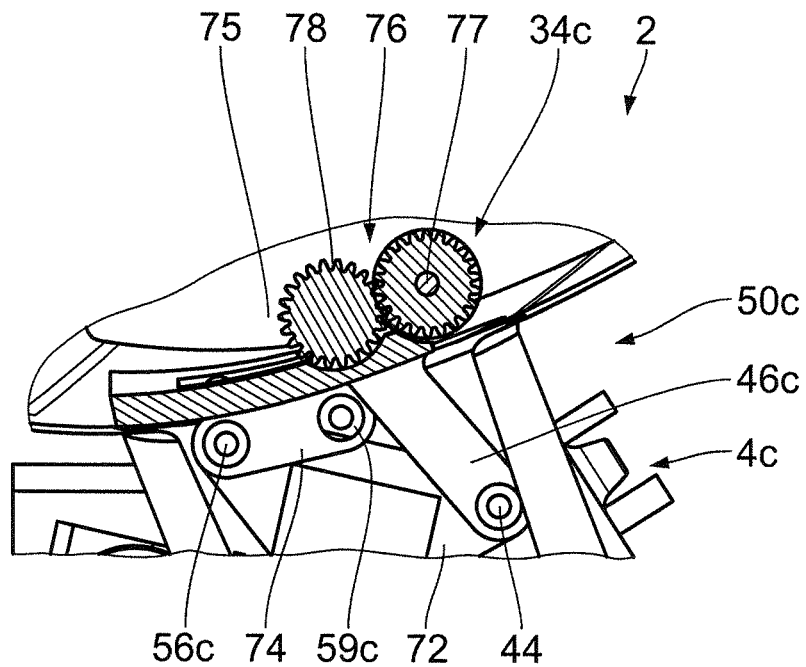
FIG. 13 shows an illustration according to FIG. 11 with the air guiding device positioned.
Figure 14:
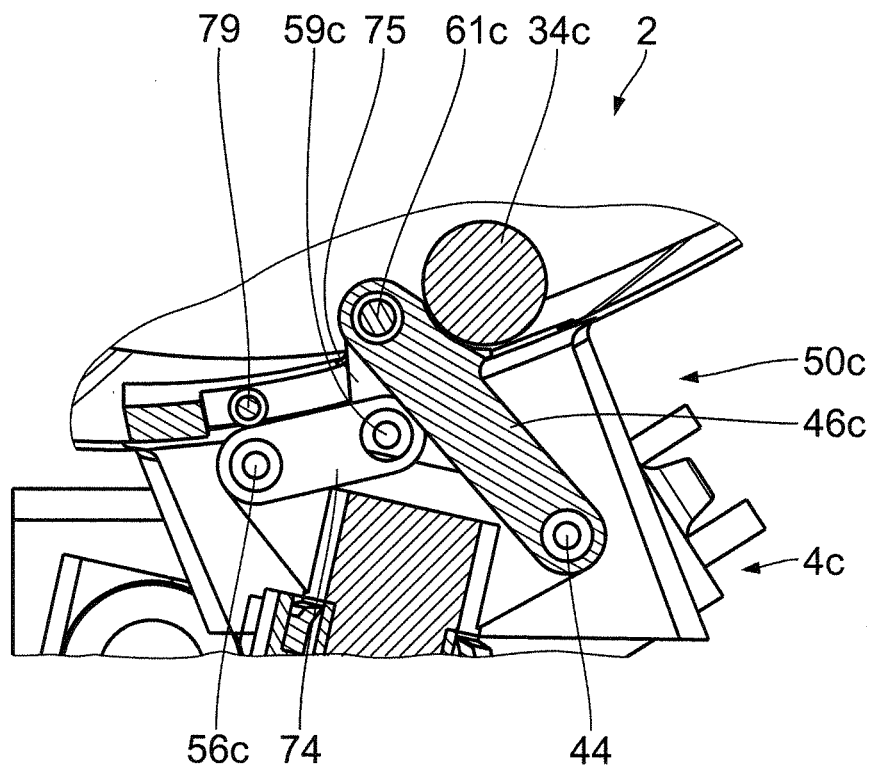
FIG. 14 shows an illustration according to FIG. 12 with the air guiding device positioned.
Figure 15:
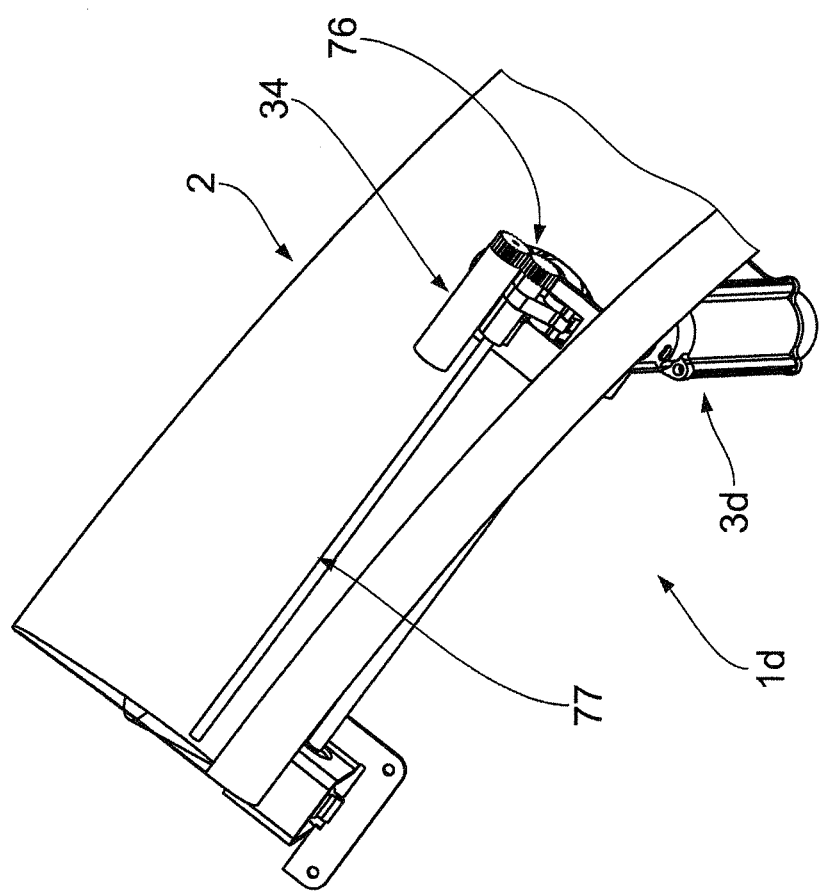
FIG. 15 shows a schematic view of the fourth exemplary embodiment from above.

A third exemplary embodiment of the invention is described below with reference to FIGS. 9 to 10. Identical parts receive the same reference numbers as in the preceding exemplary embodiments, to the description of which reference is hereby made. Functionally identical, but structurally different parts receive the same reference numbers followed by a b.

In the third exemplary embodiment, the positioning kinematic mechanism 50*b* has an eccentric 68 as the compensating device for compensating for a change in distance between the movable bearing and the positioning pivot axis 44 upon an adjustment of the angle of attack $w_A$. The eccentric 68 is designed as a circular-cylindrical element with a cylinder axis 69. The cylinder axis 69 is aligned parallel to the positioning pivot axis 44. In addition, the eccentric 68 comprises an eccentric insert 70 mounted rotatably in said eccentric. The eccentric insert 70 is preferably likewise of circular-cylindrical design. It is mounted in the eccentric 68 so as to be rotatable about an eccentric insert axis 71. The eccentric insert axis 71 is oriented parallel to the cylinder axis 69. The eccentric insert axis 71 is arranged spaced apart from the cylinder axis 69. The distance between the eccentric insert axis 71 and the positioning pivot axis 44 is therefore changeable by rotation of the eccentric 68 about the cylinder axis 69. By this means, a change in the distance between the cylinder axis 69 and the positioning pivot axis 44 upon displacement of the positioning spindle nut 37 on the positioning spindle 35 during adjustment of the angle of attack $w_A$ can be compensated for. Upon displacement of the positioning spindle nut 37 along the positioning spindle axis 36 and a resultant displacement of the second extension 63*b* parallel to the positioning spindle axis 36, the eccentric 68 is rotated about the cylinder axis 69 precisely such that the distance between the eccentric insert axis 71 and the positioning pivot axis 44 remains constant.

Whereas the second extension 63*b* is connected fixedly to the dip tube 26 as in the second exemplary embodiment, in the third exemplary embodiment the first extension 58*b* is connected fixedly to the positioning spindle nut 37. The first extension 58*b* is therefore displaceable together with the positioning spindle nut 37 parallel to the positioning spindle axis 36 by rotation of the positioning spindle 35 about the latter.

The eccentric insert 70 serves to bind the positioning spindle drive 40 to the air guiding device 2. Said eccentric insert is connected fixedly to the fastening element 46*b*. The eccentric insert 70 is preferably formed integrally with the fastening element 46*b*.

In a particularly advantageous embodiment, the positioning kinematic mechanism 50*b* is designed as an interchangeable module. It can be connected to the dip tube 26 in a simple manner for installation. For this purpose, it is inserted into that end of the dip tube 26 which faces the air guiding device 2 and is connected, for example adhesively bonded or welded, preferably screwed, to said dip tube. It is sealed off in this case from the inner wall 29 of the dip tube 26 by an O ring 86.

A fourth exemplary embodiment of the invention is described below with reference to FIGS. 11 to 15. Identical parts receive the same reference numbers as in the preceding exemplary embodiments, to the description of which reference is hereby made. Structurally different, but functionally identical parts receive the same reference numbers followed by a c. In the fourth exemplary embodiment, the positioning device 4c is integrated in the air guiding device 2. The dip tube 26 is closed off at the end thereof facing the air guiding device 2 by means of a binding element 72. The binding element 72 is of anvil-shaped design. The first mounting 56c and the fixed bearing, which defines the positioning pivot axis 44, for binding the air guiding device 2 to the dip tube 26 are arranged in the binding element 72. The air guiding device 2 is mounted pivotably about the positioning pivot axis 44 by means of the fastening element 46c which is designed in the manner of a lever. The fastening element 46c forms a basic body to which the air guiding device 2 is fixedly connected. The air guiding device 2 may also be formed integrally with the fastening element 46c.

A first link lever 74 is mounted in the first mounting 56c. The first link lever 74 is connected pivotably by means of the second mounting 59c to a second link lever 75. The second link lever 75 in turn is connected pivotably via the fourth mounting 61c to the fastening element 46c. The positioning kinematic mechanism 50c therefore has four pivot axes aligned parallel to one another. It forms a compensating device for compensating for a change in distance between the fourth mounting 61c and the first mounting 56c upon adjustment of the angle of attack $w_A$ of the air guiding device 2.

A toothed wheel 78 is fastened to the second link lever 75. The toothed wheel 78 is arranged concentrically with respect to the fourth mounting 61c. By means of the toothed wheel 78, the second link lever 75 is pivotable by the positioning motor 34 about the pivot axis defined by the fourth mounting 61c. The second link lever 75 is therefore coupled in a rotationally drivable manner to the positioning motor 34c. The toothed wheel 78 is part of a toothed wheel gearing 76. The toothed wheel gearing 76 is preferably designed as a reduction gearing. A revolution of the drive shaft 77 therefore leads to less than one full revolution of the toothed wheel 78.

However, the second link lever 75 may also be coupled directly to a drive shaft 77 which is rotationally drivable by the positioning motor 34c. The drive shaft 77 is preferably designed as a connecting shaft between the two positioning devices 4c arranged symmetrically with respect to the central longitudinal plane 7. This ensures synchronous actuation of the left and right positioning devices 4c.

The second mounting 59c can be guided through a dead center position by pivoting of the second link lever 75 about the fourth mounting 61c. The dead center position is taken up here precisely whenever the second mounting 59c is located on the connecting line from the first mounting 56c to the fourth mounting 61c.

In order to limit the pivotability of the air guiding device 2, a displaceable stop element 79 is provided. The stop element 79 defines an end position in which the first link lever 74 comes to bear against the stop element 79. In addition, a second corresponding stop element is preferably provided for defining a second end position.

The angle of attack $w_A$ of the air guiding device 2 can be adjusted by pivoting of the second link lever 75 about the fourth mounting 61c.

Figure 16:
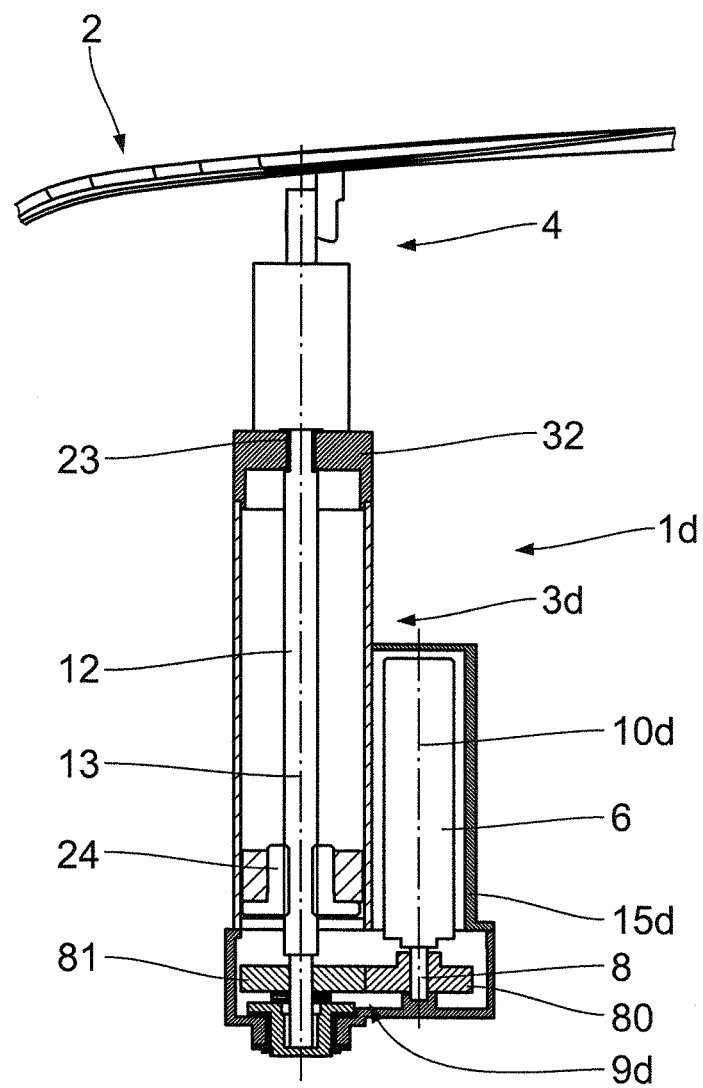
FIG. 16 shows a sectional illustration of a fifth exemplary embodiment of the invention.

A fifth exemplary embodiment of the invention is described below with reference to FIG. 16. Identical parts receive the same reference numbers as in the preceding exemplary embodiments, to the description of which reference is hereby made. Structurally different, but functionally identical parts receive the same reference numbers followed by a d. In the fifth exemplary embodiment, the electric motor 6 of the deployment devices 3d is integrated in the housing 15d. In this exemplary embodiment, the drive shaft axis 10d is aligned parallel to the spindle axis 13. The drive shaft 8 which is drivable by the electric motor 6 is mounted at the end thereof opposite the electric motor 6 in the housing 15d. A driving toothed wheel 80 is provided on the drive shaft 8. Said driving toothed wheel is in engagement with a driven toothed wheel 81. The driving toothed wheel 80 and the driven toothed wheel 81 form the gearing 9d. The driven toothed wheel 81 is connected to the spindle 12 for conjoint rotation. In this exemplary embodiment, the angle adjustment device is designed in a manner corresponding to one of the previously described embodiments.

The invention claimed is:

1. A fixture for adjusting an air guiding device on a motor vehicle, comprising:
   a. at least one linear adjustment device with a first spindle defining a first linear axis, a first drive for rotating the first spindle about the first axis, at least one first support having a first end mounted pivotally to the air guiding device at a first location and having a first spindle nut threadedly engaged with the first spindle so that the first spindle nut moves along the first spindle as the first drive rotates the first spindle for moving the first support linearly and parallel to the first axis and thereby adjusting a linear deployment of the air guiding device, and
   b. at least one angle adjustment device mounted to the first support for linear movement with the first support, the angle adjustment device including a second spindle defining a second linear axis, a second drive for rotating the second spindle about the second axis, at least one second support having an end mounted pivotally or rotationally to the air guiding device at a second location spaced from the first location and having a second spindle nut threadedly engaged with the second spindle so that the second spindle nut moves along the second spindle as the second drive rotates the second spindle for moving the second support relative to the first support for adjusting an angle of attack of the air guiding device.

2. The fixture of claim 1, wherein the adjustment devices are actuable independently of one another.

3. The fixture of claim 2, wherein at least one of the adjustment devices is lockable in infinitely variable intermediate positions.

4. The fixture of claim 2, wherein both the at least one linear adjustment device and the at least one angle adjustment device are lockable in infinitely variable intermediate positions.

5. The fixture of claim 1, wherein the at least one angle adjustment device is integrated in the at least one linear adjustment device.

6. The fixture of claim 1, wherein the at least one angle adjustment device is integrated in the air guiding device.

7. The fixture of claim 1, wherein the at least one angle adjustment device comprises a doubly mounted spindle.

8. The fixture of claim 1, wherein the at least one angle adjustment device has at least one kinematic mechanism for converting a linear movement into a pivoting movement.

9. The fixture of claim 1, wherein connecting points of the angle adjustment device to the air guiding device are at a variable distance from one another.

10. The fixture of claim 9, further comprising a compensating device for compensating for a change in distance between the connecting points.

11. The fixture of claim 10, wherein the compensating device is an elongated hole, multi-lever joint or eccentric.

12. An arrangement comprising
a. an air guiding device for a motor vehicle, and
b. the fixture of claim 1 which is connected to said air guiding device in a force-transmitting manner for adjustment of the air guiding device.

13. A motor vehicle with the air guiding device of the claim 1.

14. The fixture of claim 1, wherein the first and second spindles are substantially parallel.

\* \* \* \* \*